United States Patent [19]

Church

[11] Patent Number: 4,689,877
[45] Date of Patent: Sep. 1, 1987

[54] METHOD AND APPARATUS FOR CONTROLLING THE THROAT HEIGHT OF BATCH FABRICATED THIN FILM MAGNETIC TRANSDUCERS

[75] Inventor: Mark A. Church, Los Gatos, Calif.

[73] Assignee: International Business Machines Corp., Armonk, N.Y.

[21] Appl. No.: 885,894

[22] Filed: Jul. 15, 1986

Related U.S. Application Data

[63] Continuation-in-part of Ser. No. 760,189, Aug. 29, 1985, abandoned.

[51] Int. Cl.[4] .................. G11B 5/127; B23Q 17/00; B23Q 15/00
[52] U.S. Cl. .................................. 29/603; 29/407; 29/705; 29/707; 51/165 R
[58] Field of Search ................ 29/602 R, 603, 592 R, 29/705, 707, 720; 73/104, 105; 51/165 R

[56] References Cited

U.S. PATENT DOCUMENTS

| | | | |
|---|---|---|---|
| 3,035,377 | 5/1962 | Bovensiepen et al. | 51/165 R |
| 3,063,206 | 11/1962 | Meyerhoff et al. | 51/165 R |
| 3,787,638 | 4/1972 | Muroi . | |
| 3,821,815 | 10/1972 | Abbott et al. | 360/110 |
| 3,921,340 | 11/1975 | Johnson et al. | 51/165 R |
| 4,014,141 | 3/1977 | Riddle et al. | 51/165 R |
| 4,155,106 | 12/1982 | Muraoka et al. | 360/112 |
| 4,407,094 | 10/1983 | Bennett et al. | 51/165 R |
| 4,477,968 | 10/1984 | Kracke et al. | 29/603 |
| 4,511,942 | 4/1985 | Valstyn | 360/126 |

OTHER PUBLICATIONS

IBM Tech. Discl. Bull., vol. 11, No. 12, May 1969, p. 1792, "Alignment of Read-Write Heads in Slides".
IBM Tech. Discl. Bull., vol. 23, No. 6, Nov. 1980, p. 2550, "Lapping Guides for Magnetic Heads".
IBM Tech. Discl. Bull., vol. 18, No. 1, Jun. 1975, p. 227, "Throat Height Control".

*Primary Examiner*—Howard N. Goldberg
*Assistant Examiner*—Irene Graves Golabi
*Attorney, Agent, or Firm*—Otto Schmid, Jr.

[57] ABSTRACT

A method for determining the position of a lapped edge of a substrate during lapping of a row of thin film magnetic transducer elements. First and second electrical lapping guide structures are formed on each side of the row of transducer elements. The lapping guide structures include a series of switching junctions, each switching junction paralleled by a resistor. A lapping resistor which provides a change in resistance proportional to the lapping of the row is measured and compared with the position of the lapping plane as determined from each switching junction change of state. Calibration of the resistor versus lapping plane position is effected to permit an accurate determination of the lapped surface from subsequent resistance measurements of the lapping resistor.

10 Claims, 6 Drawing Figures

METHOD AND APPARATUS FOR CONTROLLING THE THROAT HEIGHT OF BATCH FABRICATED THIN FILM MAGNETIC TRANSDUCERS

This is a continuation-in-part of application Ser. No. 06/760,189, filed Aug. 29, 1985, now abandoned.

The present invention relates to methods and apparatus of manufacturing thin film magnetic transducers. Specifically, a method and apparatus for determining the position of a lapped edge of a substrate during lapping of the transducer pole tips to a final throat height is provided.

Thin film transducers for reading magnetic disc structures are batch fabricated through thin film deposition techniques. Typically, transducers are formed in rows and columns on a substrate. The substrate is then cut into a plurality of rows of transducers in a side-by-side relationship with the pole tips of the transducers extending to an edge of the substrate row. In order to achieve a maximum transducing efficiency, the pole tip length must be lapped to a final dimension known as throat height. The final throat height for a given thin film transducer must be established within a minimum tolerance in order to provide for transducing efficiencies capable of handling state of the art data recording densities.

Lapping of the pole tip ends which define an air bearing surface is measured by an electrical lapping guide (ELG) structure. A lapping guide is located on each end of a substrate row at each end of the row of transducers. The ELG is adjacent to the surface to be lapped and provides electrical signals identifying the position of the lapped surface. The ELG structure will be used to signal the lapping machinery when the lapped surface has progressed to a final throat height position.

Current requirements for throat height control require that flatness of the lapped substrate surface be maintained. In order to achieve the required flatness and lower the amount of recession of the pole pieces of the transducers as a result of the lapping process, the final lapping to the final throat height is accomplished during a final wash cycle. The wash cycle is fixed to lap for a calculated wash cycle time which produces a very fine lapping of the pole tips. The final lapped distance of the prior art represents an estimate based on a predetermined lapping time versus lapped distance relationship as current ELG structures do not have sufficient resolution to measure the final distance lapped during the fine lap procedure. The present invention provides an ELG structure capable of monitoring lapping during a final fine lap cycle as well as during the rough lapping stages to achieve final throat height.

SUMMARY OF THE INVENTION

It is an object of this invention to provide for an accurate monitoring of the position of a lapped edge.

It is another object of this invention to provide for an accurate monitoring of the throat height of batch fabricated thin film magnetic transducers.

It is a more specific object of the invention to measure the position of opposite ends of a lapped edge defining the throat height of batch fabricated thin film magnetic transducers.

These and other objects are derived from a method and apparatus in accordance with the invention. An electrical lapping guide structure is formed on preferably two (2) opposite ends of a substrate bearing a row of thin film magnetic transducers. The substrate is lapped to a final throat height dimension along one edge. The position of the lapped edge is monitored at opposite ends with the electrical lapping guide structures.

The electrical lapping guide is formed with at least one switching junction which changes state during lapping of the substrate. The switching junction includes a parallel resistance element. The switching junction has a distinct switching plane which is a known distance from the desired final throat height dimension. When the lapped edge coincides with the switching plane, a distinct stepwise change in resistance is detected across the switching plane.

In a preferred embodiment of the invention, each lapping guide includes a plurality of switching junctions and shunt resistance elements formed as a series circuit. Each switching junction of a series is located to have a switching plane a known distance from the final throat height dimension, and different from the remaining switching junctions. The series circuit experiences a stepwise change in resistance as the lapping progresses. The lapped substrate edge position at each of the switching planes is therefore detectable at discrete switching planes.

The method of the preferred embodiment further includes depositing a resistance element on the substrate for each lapping guide. The resistance element has a configuration which provides a resistance change as lapping progresses. The resistance element resistance change versus lapped distance is determined by comparing each lapping edge position detected by each switching junction state change with the measured resistance element resistance. Thus, as the lapping edge approaches the final throat height position, the resistance element characteristic resistance change versus lapping distance characteristic is accurately known.

Each electrical lapping guide provides for position measurements of each end of a lapped edge. Thus, the level of the lapped edge may be determined and corrective forces applied to the substrate to maintain the lapped edge level with respect to the final throat height dimension of the transducer row.

DESCRIPTION OF THE PREFERRED EMBODIMENT

Figure 1:
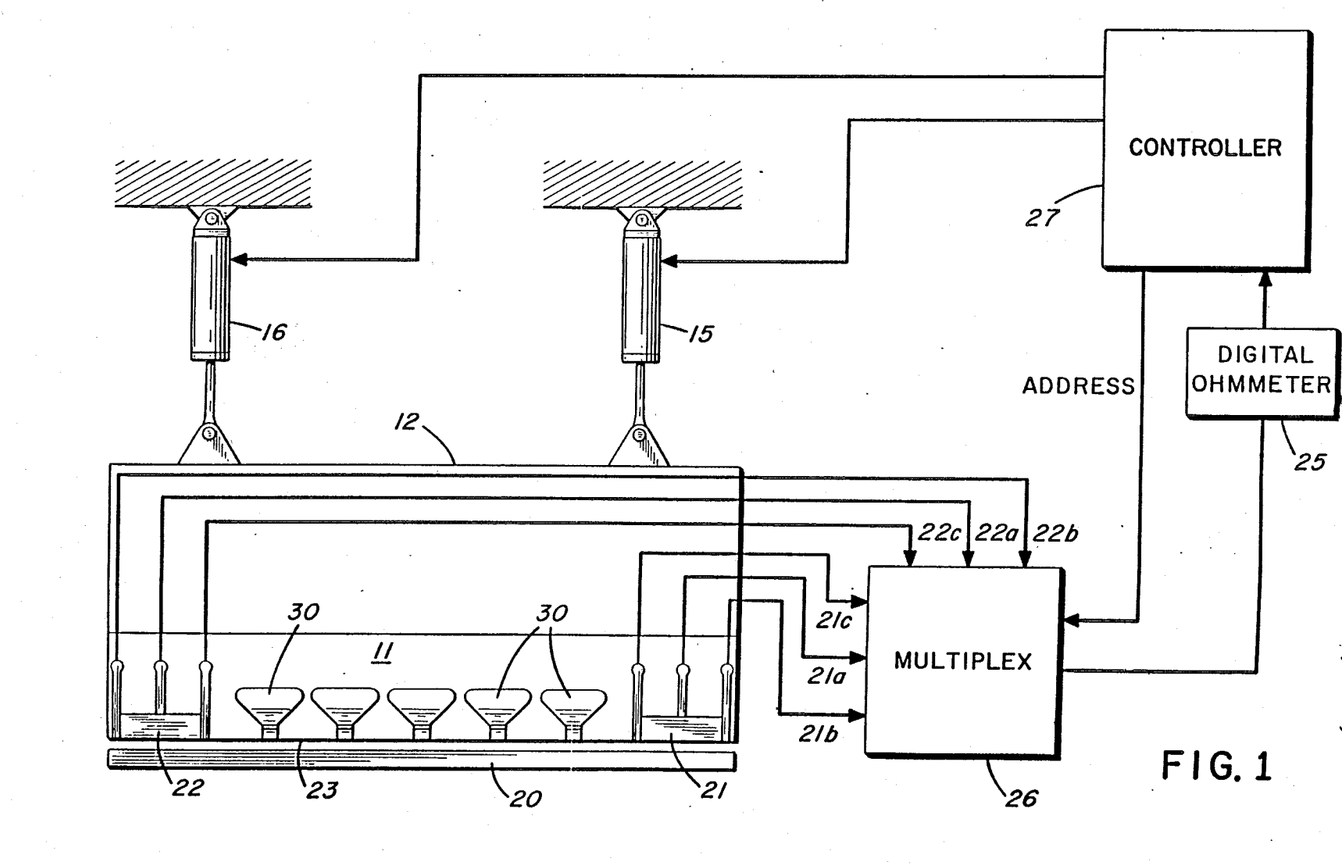
FIG. 1 is a block diagram of apparatus for lapping a substrate edge to a final dimension.

Referring now to FIG. 1, there is shown an overall block diagram of apparatus for lapping a surface 23 of a substrate row 11 to establish precision throat heights for a plurality of thin film magnetic transducers 30. The apparatus of FIG. 1 includes a lapping fixture 12 for holding the substrate 11 in position over a lapping plate 20. Lapping plate 20 is an abrasive surface for accurately lapping surface 23 to a final dimension.

The force applied to lapping fixture 12 is derived from first and second pressure actuators 15 and 16. Varying the force applied by the actuators 15 and 16 against substrate 11 controls leveling of the lapped surface 23.

Measurements of the deviations from a level surface are provided by electrical lapping guides 21 and 22. Electrical lapping guides 21 and 22 provide signals indicative of the distance lapped, identifying the position of the plane of the lapped surface 23 with respect to a desired final transducer dimension. These electrical measurements are applied to a multiplexer 26. Digital ohmeter 25 measures the resistance of each electrical lapping guide 21 and 22 through the multiplexer 26. The resulting resistance measurements determine the position of the lapped surface 23 with respect to the right and left ends of substrate 11 by directing the output of the digital ohmmeter 25 to a controller 27. The controller 27 in turn activates the actuators 15 and 16 to level the substrate row 11 relative to the lapping plate 20 thereby insuring that the throat heights of all of the transducers 30 are at the same length.

Figure 2:
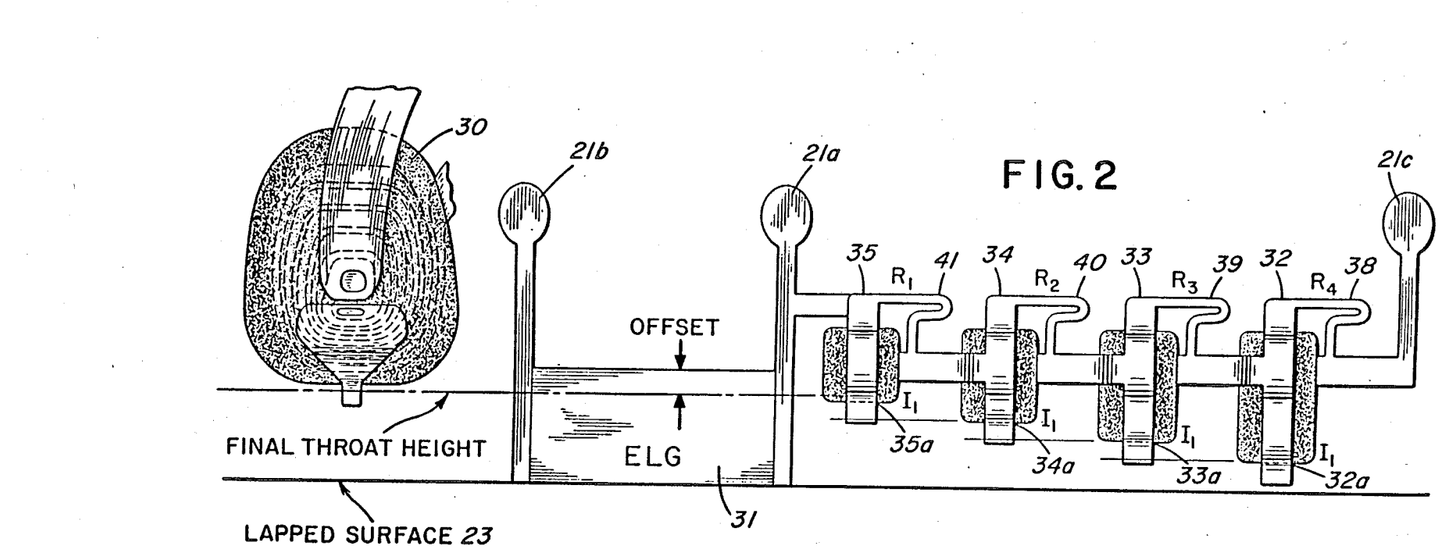
FIG. 2 is a plan view of an electrical lapping guide for carrying out an embodiment of the invention.

Referring now to FIG. 2, there is shown more particularly a plan view of the electrical lapping guide structure 21 with respect to the lapped surface 23, and the final dimension, identified as the final throat height where lapping is to cease. It is, of course, understood that the left hand electrical lapping guide 22 is the mirror image of the right hand electrical lapping guide 21 and will not therefore be further described.

Adjacent to the thin film transducer 30 is the electrical lapping guide structure 21 which includes an electrical lapping guide resistor 31. As surface 23 is lapped by the lapping plate 20, the resistance value measured between terminals 21a and 21b will vary according to the following relationship:

$$R = \frac{\rho}{t} \times \frac{l}{w} \tag{1}$$

where

R = resistance of lapping guide resistor 31
$\rho$ = resistivity of the material comprising resistor 31
l = the resistor 31 length
w = the resistor 31 width
t = the thickness of resistor 31.

Lapping of surface 23 will reduce the width w of resistor 31, increasing the resistance R of resistor 31. Measuring this resistance makes it possible to monitor the positional change of lapping surface 23 as it approaches the final throat height.

The electrical lapping guides 21 and 22 are deposited by thin film deposition techniques during the manufacture of each of the thin film transducers 30. It is assumed that the length l, resistivity and thickness t of the resistor 31 have been controlled during manufacture. Thickness is controlled during the deposition of the transducer elements on the substrate 11. The resistivity is determined by the metallic layer used as the resistor 31. Chromium is preferred, but any other metal such as nickel-iron of the pole pieces could be used. The length and width of the resistor 31 is determined in the mask used to form the resistor 31. The length of the resistor is preferably approximately 500 micrometers. The resistivity, thickness and beginning width for the electrical lapping guide resistor are typically of the following dimensions and values:

$\rho$ = 0.55 micrometers
t = 0.25 micrometers
l = 500.0

For convenience, $\rho/t \times l$ of equation (1) may be represented as k, and for the preferred embodiment is equal to 1100.

Adjacent to the electrical lapping guide resistor 31 and part of the electrical lapping guide structure 21 are a plurality of switches 32 through 35. Although four (4) are shown in FIG. 2, in the preferred embodiment of the invention, a total of six (6) switches are incorporated on the substrate adjacent an end of each row of thin film transducers 30.

Each of the switches 32 through 35 have a switching junction 32a through 35a, located at a specific distance from the final throat height. The switches are deposited on substrate 11 during the deposition of the transducers 30 onto the substrate 11. By depositing switching elements 32 through 35 during the deposition of the thin film transducer 30, the planes at which the switching junctions change state are accurately located with respect to final throat height. Connected in parallel with each switching junction is a single shunt resistance 38 through 41. The shunt resistance 38–41 can be formed at the same time and of the same material as the resistor 31. The switching junctions are serially connected, forming a series circuit between terminals 21a and 21c.

Figure 5:
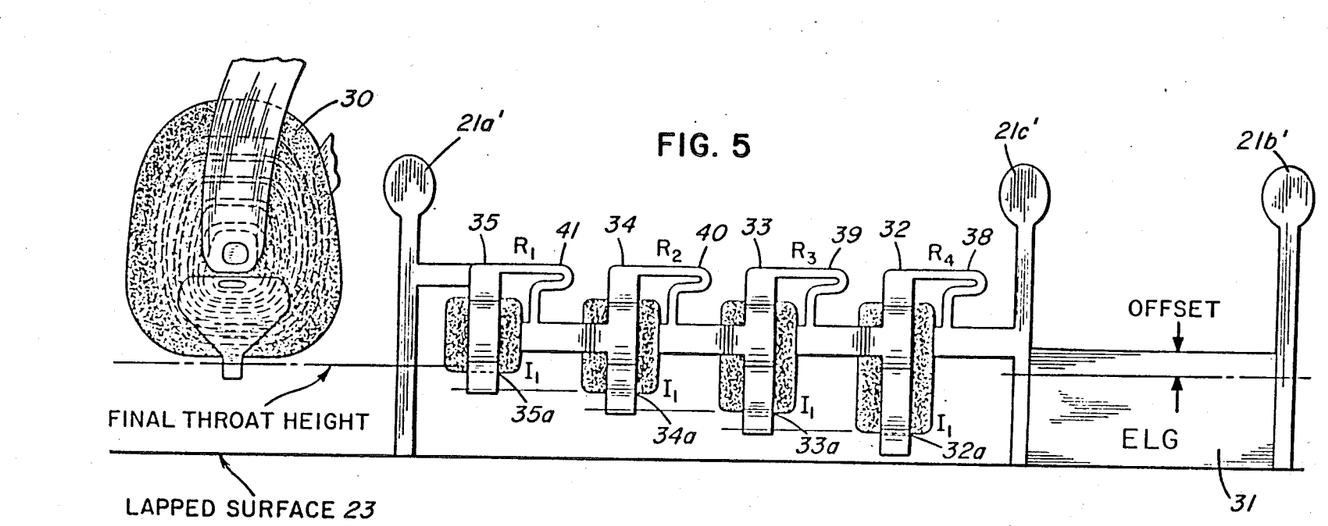
FIG. 5 is a plan view of an electrical lapping guide for carrying out a preferred embodiment of the invention.

Another embodiment of the electrical lapping guides 21 and 22 is shown in FIG. 5, and the principle of operation of this apparatus is the same as that for the embodiment shown in FIG. 2. In this embodiment the switches 32 through 35 are deposited in a series electrical circuit between terminals 21a' and 21c' close to the last thin film magnetic transducer 30 in the row. The electrical lapping guide resistor 31 is deposited toward the end of the row in an electrical circuit between terminals 21c' and 21b'. Since this embodiment is less sensitive to variations in the manufacturing process, the embodiment shown in FIG. 5 is the preferred embodiment.

When the lapped surface 23 is coincident with the switching plane 32a of switching junction 32, the switching junction will change state. Preferably, switching junction 32 will change from a conducting to a nonconducting state, presenting a distinct binary change in resistance rather than a gradual change in resistance as lapping occurs. Thus, the current path between terminals 21a and 21c will necessarily be through shunt resistance 38. At this time, when the digital ohmeter 25, connected to controller 27 of FIG. 1, measures a step increase in resistance between terminals 21a and 21c, the position of the lapping surface 23 is accurately known with respect to the final throat height. As each switching plane 32a through 35a is accurately known with respect to final throat height, each discontinuity in resistance measurements appearing between terminals 21a and 21c provide for an accurate check of the lapping surface 23 at various positions with respect to final throat height. Each shunt resistance is located a distance from the final lapping edge to avoid being lapped or severed during lapping.

The measurement of a change in state of each switching junction 32 through 35, as seen by the total resistance appearing between terminals 21a and 21c, may be used to calibrate the electrical lapping guide resistor 31. As such, the electrical lapping guide resistor 31, when approaching the final throat height, will be accurately calibrated, permitting the lapped surface 23 to be positioned within a nominal throat height of approximately 1 to 2 microns to the desired final throat height.

Figure 4:
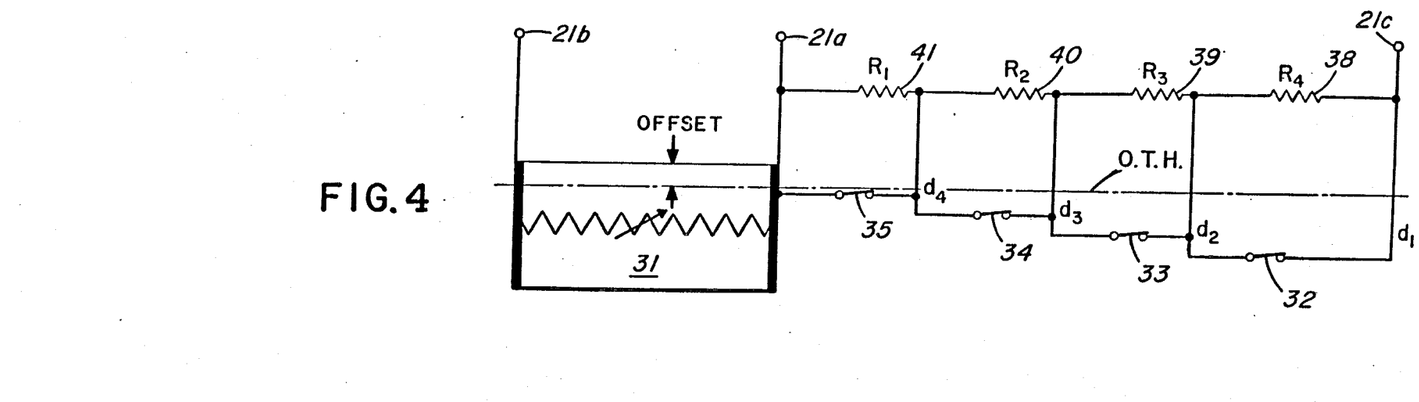
FIG. 4 is an electrical schematic demonstrating the operation of the ELG structure of FIGS. 2 and 3.

The change in electrical resistance appearing between terminals 21a and 21c can readily be recognized with reference to FIG. 4. FIG. 4 electrically represents the position of each switching junctions 32 through 35 with respect to the final throat height. It is clear that as the lapping surface 23 is lapped away, switches 32 through 35 will, in sequence, be rendered in an open circuit condition. Each open circuit condition which results from lapped surface 23 progressing toward final throat height, is seen as the addition of resistances 38 through 41 in the series circuit represented between terminals 21a and 21c. Of course, during the switching of junctions 32 through 35, the analog resistance measured between terminals 21a and 21b will be changing in accordance with the above equation.

Figure 6:
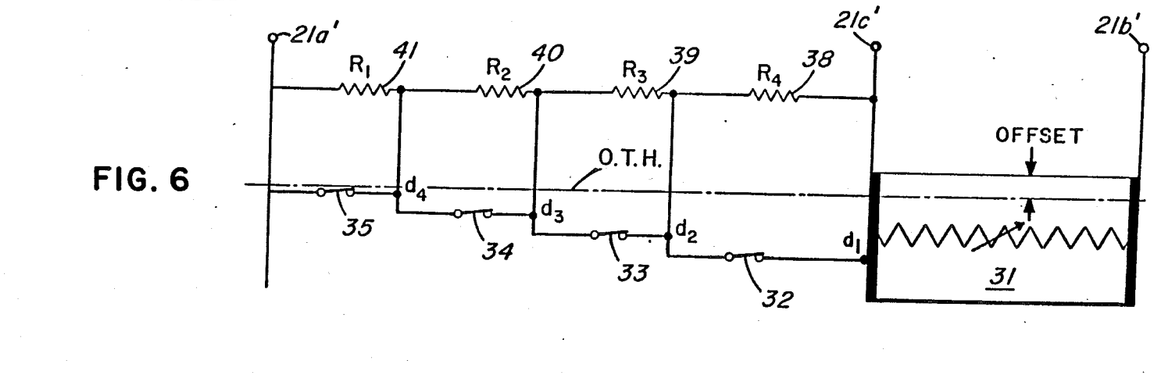
FIG. 6 is an electrical schematic demonstrating the operation of the ELG structure of FIG. 5.

The change in electrical resistance appearing between terminals 21a', 21b' and 21c' of FIG. 5 can be determined by reference to FIG. 6. This change in resistance is the same as that described above with reference to FIGS. 2 and 4 for the corresponding elements.

With the foregoing calculation, it is possible to determine with two ELG structures on opposite sides of the lapped surface, the required force differential to maintain the lapped surface level with respect to the final throat height for the transducer array. Additionally, an end resistance may be determined for each electrical lapping guide resistor 31 identifying a desired throat height. Lapping may then be terminated on this desired throat height. Thus, the prior art technique of fine lapping during a wash cycle by setting a pre-fixed wash cycle time may be avoided as the resistor 31 is sufficiently accurate at this stage in the lapping process and its width close to the end of the lapping process to determine a fine lapping point. Alternatively, lapping may be terminated when the last of the switches, switch 35, changes state.

Figure 3:
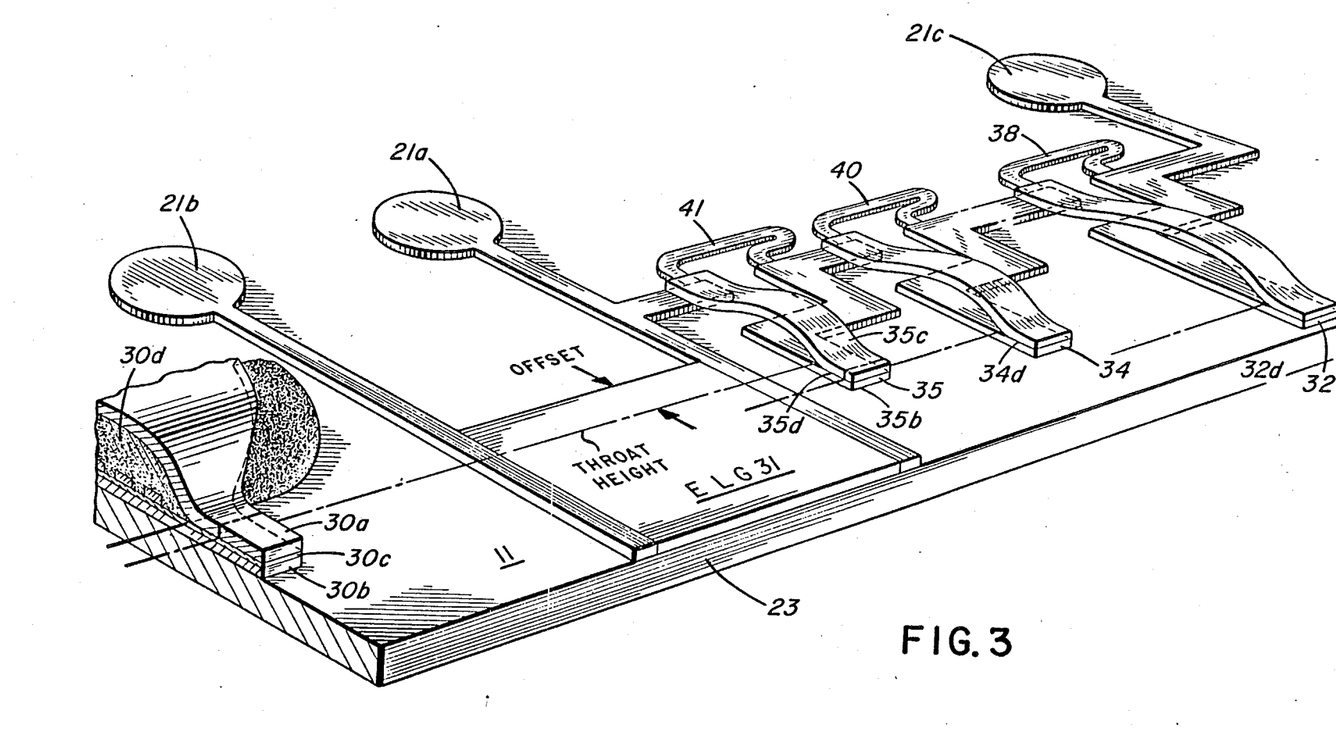
FIG. 3 is an isometric view of the electrical lapping guide of FIG. 2.

A perspective view of the electrical lapping guide structure shown in FIG. 2 appears in FIG. 3. FIG. 3 demonstrates the relationship between each of the switching junctions 32 through 35, and the final throat height, TH. An insulative magnetic gap layer 30c is deposited between pole pieces 30a and 30b of transducer 30. Another layer, not shown, such as a conductive coil layer and other insulation layers 30d are deposited on the substrate 11 between the pole pieces 30a and 30b and form a part of the transducer 30. The insulation layer 30d between the pole pieces 30a and 30b determine the throat height of the transducers. During the deposition of the pole pieces 30a and 30b each half of switching junctions 32–35, including conductor 35c and 35b, for example, are deposited on substrate 11. An insulation layer separates the conductors of the switching junction except at switch contact points 32d–35d. Thus, by depositing the conductor elements and insulation layer of switching junctions 32 through 35, corresponding structural elements of transducer 30, i.e., the pole pieces 30a and 30b and the insulation layer 30d, are deposited on substrate 11. The registry of the corresponding switching planes is defined by the leading edge of the insulation layers that separates the conductors of a switching element. Thus the registry of the switching junctions 32–35 with respect to the final throat height is maintained. The electrical lapping guide resistor 31 is also deposited on the substrate 11 at the same time transducer elements 30 are formed. Thus, during manufacture of the transducer array, registry is maintained between the electrical lapping guide components including the contact joints of the switching junctions 32 through 35, and electrical lapping guide resistor 31. The resistors 38 through 41 are deposited as a thin film of chromium with a resistance of 100 Ohms. The 100 Ohm chromium resistor appears across the switching junction having a closed circuit resistance of approximately 1 Ohm. Insulation material is deposited between the conductor elements 35c and 35b to define the switch contact joint 35d. The insulation layer for each of the switches 35 through 32 is deposited at the same time the insulation layer 30d that determines the throat height TH is deposited for transducer element 30, thus maintaining accurate control over the switching junctions with respect to final throat height. The geometry of the conductor elements of each switching junction are also maintained congruent with the pole piece 30a, 30b geometry since these elements are all deposited during the same process. The commonly formed insulation layer and conductor geometries improve the overall precision location of switching planes with respect to the final throat height.

The electrical lapping guide structure shown in FIG. 5 is also fabricated in a manner similar to that described above and shown in FIG. 3. As described above, the embodiment of the ELG shown in FIG. 5 is less sensitive to variations in the manufacturing process. It has been found that variations in the thickness of the insulation layers and variations in the thickness of the conductor elements of each switching junction can cause variations from the desired value in the final throat height of the transducer elements 30. It has also been found that variations in thickness of the insulation layers and in the conductor elements are more likely to occur near the edge of the substrate 11 than near the center of the substrate 11. The embodiment of FIG. 5 places the last of the switching junctions, switch 35 near the last transducer 30 in the row. This is the switching junction which is the final switching control on throat height, and the closer proximity reduces the chance of a substantial difference in thickness of either the insulation layer or the conductor elements between the position of the last transducer 30 and the position of the last switching junction 35. The electrical lapping guide resistor 31 is near the edge of the substrate where it has been found that thickness variations are more likely to occur, but this produces less chance for a significant impact on final throat height accuracy since the resistor 31 is calibrated at relative positions during the lapping operation.

The electrical lapping guide resistor 31 is deposited between two conductors which form terminals 21a and 21b in the FIG. 2 embodiment or between two conductors which form terminals 21b' and 21c' in the FIG. 5 embodiment. The electrical lapping guide resistor 31 is also preferably of chromium and is deposited at the same time as resistors 38 through 41 are deposited on substrate 11.

By measuring the relative position of lapped surface 23 with respect to the right and left ends of substrate 11, it is possible to maintain lapped surface 23 level with respect to final throat height for the entire array of transducers 30 on substrate 11. The controller 27 can be a computer programmed with an algorithm which will determine a force differential for transducers 15 and 16 which will correct leveling errors. The force differential is determined as:

$$Fd = \left( \frac{K}{R_{31}L} - \Delta w \right) / \frac{K}{R_{31}R}$$

where
$R_{31}L$ is the resistance of the left electrical lapping guide resistor 31
$R_{31}R$ is the resistance of the right electrical lapping guide resistor 31
$\Delta w$ is the difference in OFFSET distance of each lapping guide resistor 31.

The offset distance is shown in FIGS. 2 and 3 as the distance from the rearward edge of resistor 31 to the throat height dimension.

Continually determining the force differential necessary to level the lapping surface 23 and applying the differential force with the actuators 15-16 will achieve a substantially level condition.

The calculated final throat height resistance of electrical lapping guide resistor 31 may be represented by the following:

$$R_{31} = \frac{K}{\text{OFFSET} + TH}$$

where the OFFSET distance of each lapping resistor is determined by OFFSET = $K/R_{31} - Dd_n$, $Dd_n$ being the switching position of a given switching junction.

The computer 27 is programmed to measure the resistance of each leveling resistor of each lapping guide, both left and right, and the serial arrangement of six (6) switching junctions. The parameters of the resistors and switching junctions which are utilized to determine the level condition of lapping surface 23 include the OFFSET of each leveling resistor, as shown in FIG. 3. The OFFSET represents the distance from the desired throat height to the rearward resistor edge, parallel with the lapping surface 23. The distance from the throat to a given detector switching plane, generically described as $Dd_n$, and desired throat height, TH, are utilized to determine the following calculations.

The OFFSET is calculated for each of the leveling resistors by utilizing the following formula:

$$\text{OFFSET} = \frac{K}{R_{31}} - Dd_n$$

The difference in OFFSETs between the right and left leveling resistors is expressed as:

$$\Delta w = \text{OFFSET}_{R\ left} - \text{OFFSET}_{R\ right}$$

With the difference in OFFSETs, it is possible to determine a force differential between the actuators 15 and 16, such as to correct for an unlevel lapping surface. This differential, Fd, previously described is:

$$Fd = \left( \frac{K}{R_L} - \Delta w \right) - \frac{K}{R_R}$$

By calculating the force differential in accordance with the above formulation, the computer 27 will set a force differential for the actuators 15 and 16, according to the following determination:

Fd<0 Left force<Right force

Fd=0 Left force=Right force

Fd>0 Left force>Right force

This force determination is a subroutine in programming steps to be described, such that computer 27 will provide the appropriate force differential to the substrate 11 to correct any leveling errors.

As a final basic calculation for the system, a final throat height resistance is determined from the electrical lapping guide resistor 31 for each side of the transducer substrate row according to the previously described relationship:

$$R_{31(side)} = \frac{K}{\text{OFFSET}_{(side)} + TH}$$

In view of the foregoing basic calculations, which provide for leveling information, as well as for a final throat height determination, the following programming steps have been incorporated in the computer 27. These programming steps, described in pseudo-code, are useful for electrical lapping guide structures having the six (6) switching junctions described in the foregoing. Of course, six (6) is not necessary to implement the invention, but is, however, considered preferable. The pseudo-code described is a series of do loops, each beginning from 1 to n where n=number of switching junctions employed in the electrical lapping guide structure.

Prior to beginning the lapping process, a number of values are inserted in the computer 27. The first being the value of the constant K, previously described with respect to equation 1. The distance from the final throat height to each switching plane $Dd_1$ to $Dd_6$, is inserted in the computer program. The program to be described will, at the user's option, end lapping on a calculated throat height, as inserted in the computer program, or on the last change of state of the switching junction closest to the final throat height. In the event that a calculated throat height is to be used as the endpoint for ceasing lapping operations, this calculated throat height (TH) is loaded into the computer program. A wash cycle distance Wc is also inserted in the program. At the end of the coarse lapping, as is known to those skilled in the art, a wash cycle which affects a finer lapping to the lapped surface 23 permits lapping for a specified distance of Wc.

An additional subroutine will be employed in the programming to read the left and right resistance values provided by each electrical lapping guide resistor 31. This subroutine additionally subtracts a lead resistance before making the measured values available for program execution. A lead resistance constant would normally be included in the subroutine, however, this may also be inputted by the operator with the other parameter values.

The program is configured in three (3) separate portions which will be described in pseudo-code programming format as DO LOOPS.

The first portion comprises a section of the program which will, during lapping to the first of the switching junction, execute the following steps.

```
Do until first switching junctions activate and level
resistor values stored
    Call read Left & Right R31 values
    Calc force differential
    Read level R31 values right and left
    Fd = R31Left − R31 Right                        Equation (1)
    Call set mechanics
    If both left and right detectors activate
        Then
            Store both level R values in
            R1n and Rrn respectively
        If one detector activates
            Store level R value in Rside
            Rside = 1.0 (detected side)
            Rside = 0.0 (undetected side)
            Calc force differential
            Call set mechanics
            Do until other detector activates
            If other detector activates
                Then
                    Call read Left and Right R values
                    Store other level R value in Rside
```

The result of the first portion of the code is to calculate a force differential and apply the force differential through the actuators 15 and 16 to the substrate 11. This force differential is calculated before the first switching junction, referred to as a detector in the pseudo-code, of each side of the substrate changes state by subtracting the resistance levels measured at each side of the substrate of each electrical lapping guide resistor 31 and 32. The SET MECHANICS subroutine called to establish this force differential on the actuators 15 and 16.

If corresponding switching junctions on each electrical lapping guide structure change state simultaneously, then the value of each electrical lapping guide resistor, left and right, are stored.

In the event that only one switching junction on one of the electrical lapping guide structures changes state, indicating a non-level condition, the two ELG resistors 31 of each side of the substrate are measured and set to 1 and 0, respectively. The force differential is calculated and the SET MECHANICS apply the calculated force for the actuators 15 and 16.

When the second of the switching junctions of the opposite electrical lapping guide structure is found to change state, the left and right R31 resistor values are read and stored.

Thus, after a pair of switches on opposite sides of the substrate in different ELG structures changes state, the first portion of the programming is completed.

The second portion of the programming below consists of performing a series of calculations when lapping progresses from the first pair of switching junctions which have been activated to the third pair to change state.

```
Do N from 1 to 3
    Calc offsets right and left
```

$$W\text{side} = \frac{K}{R_{siden}} - Dd_n \quad \text{Equation (2)}$$

```
Store offsets in Wsiden
Calc Δ offset
```

$$W = W1_n - Wr_n \quad \text{Equation (3)}$$

```
Store offset in ΔWn
Do until next detector activates
    Call read next Left & Right R values
    Calc new force differential
```

$$Fd = \left(\frac{K}{R_{31L}} - W\right) - \frac{K}{R_{31R}} \quad \text{Equation (4)}$$

```
        Call set mechanics
    End do until next detectors activate
    If both detectors activate
        Then
            Store both level R values in Rside
        Else
            If one detector activates
                Then
                    Store level resistor values in Rside
                    Rside = 1.0 (detected side)
                    Rside = 0.0 (undetected side)
                    Calc force differential            Equation (1)
                    Fd = R31L − R31R
                    Do until other side detected
                        Call set mechanics
                    End do until other side detected
                    Read and store other level resistor in Rside
End do N from 1 to 3
Calc & store next offset in Wside              Equation (2)
Calc & store next ΔW in ΔWside                 Equation (3)
```

The OFFSETs, $W_{side}$, for the right and left ELG structures are calculated and stored in a matrix. The differential offset w is also stored as lapping progresses between the first pair of switching junctions to change state and the third pair to change state.

As lapping proceeds from the first pair of switching junctions to change state a force differential is calculated based upon equation 4. This force differential is applied through the set mechanics to the actuators 15 and 16 until the subsequent pair of switching junctions, one in each ELG structure, change state.

In the event that only one switching junction on one side of the substrate 11 changes state, a force differential is calculated as was accomplished earlier until the remaining switching junction of the other electrical lapping guide structure changes state. When both switching junctions have changed state, the two resistors $R_{31}$ are measured and their resistance values stored.

The above routine is repeated until the third pair of the switching junctions changes state.

The OFFSETs, $W_{side}$, and difference in offsets, $\Delta w$, are calculated at the completion of the above steps and stored.

The following steps executed by the computer program of computer 27 occur during the lapping of substrate 11 between switching junctions 3 to 6.

```
Do N from 3 to 6
    Find the largest absolute value of
    ΔW1 to ΔWn and store its real value W1
    Check error correction value
```

$$W = \left[\sum_{k=1}^{n}\right] \Delta W_k - W_1/n - 1 \quad \text{Equation (5)}$$

```
Do until next detector pairs activate
    Call read level R values
    Calc force differential
```

$$Fd = \left(\frac{K}{R_{31L}} - W\right) - \frac{K}{R_{31R}}$$

```
    Call set mechanics
    If end on calculated throat height
        Then
            Find largest offset values for left
            and right and store off
```

-continued

Average offsets $$\text{OFFSETS} = \frac{\left[\sum_{k=1}^{n} W_{sideK}\right]}{n-1} - \text{OFF} \quad \text{Equation (6)}$$

Calc final throat resistance $$R_{side} = \frac{K}{\text{OFF}_{side} + Th} \quad \text{Equation (7)}$$

If $RE_{side} - R_{side} < 0$     Equation (8)
Then
Print data
Exit program
If not in wash cycle
Then
If end on calculated throat height
Then
Calc wash cycle resistance $$R_W = \frac{K}{\text{OFF}_{side} - Th + W_c} \quad \text{Equation (9)}$$

If $R_W - R_{side} < 0$
Then
Fix wash cycle in on condition
Else
Calc wash cycle resistance $$R_W = \frac{K}{\text{OFF}_{side} + Dd_6 + W_c} \quad \text{Equation (10)}$$

If $R_W - R_{side} < 0$
Then
Fix wash cycle in on condition

As lapping progresses from the third switching junction pair to change state, the stored differential offsets Ww are examined and the largest differential offset is identified. An average of the offsets determined is computed according to equation (5). When the next pair of switches on opposite sides of substrate 11 change state, each resistor 31 is measured and a force differential calculated. The force differential is applied through the set mechanics to the actuators 15 and 16.

If the operator of computer 27 has entered a calculated throat height at which lapping is to cease, then the computer determines the largest of the previous offset values determined, and averages the offset measurements according to equation (6). The final throat height resistance is calculated by equation (7) and compared with the actual measured resistance of each ELG resistor 31 of each side of the substrate 11. When the calculated final throat height resistance is equal to the actual measured resistance of resistor 31, equation (8) will terminate lapping.

As was mentioned, typically in lapping substrates 11, a final lapping distance is obtained in a wash cycle. The wash cycle will typically lap from approximately 5 microns within final throat height to a final throat height measurement. The final throat height measurement indicated as the ideal throat height, may, of course, be set to any distance from this height. In the event a throat height is selected other than this final throat height, this nominal throat height is utilized in equation (9) with the wash cycle lapping distance, $W_c$, to calculate a final lapping resistance, $R_W$ for each ELG resistor 31. The wash cycle resistance is continuously compared with the measured ELG resistance 31 of each side of substrate 11. When the wash cycle resistance equals the measured resistance, the wash cycle is effected for final lapping of the substrate.

In the event that the lapping is not to end on a calculated throat height, but rather is to end on the changing of state of one of the switching junction, the programming steps will calculate a wash cycle resistance RW according to equation (10). The wash cycle resistance is compared with each measured resistance of resistors 31, and the switching junction on which the lapping is to end is monitored.

The following sequences of steps are executed depending on whether one of the remaining detector pairs is activated, or both.

---

If one detector activates
Then
Store level R value in Rside
Calc & store next offset in     Equation (2)
$W_{siden}$
If both offsets stored
Then
Calc and store next $\Delta W$ in $\Delta W_n$
Else
If both detectors have activated
Then
Store level R values in
$R1_n$ and $Rr_n$
Calc & store next offsets in     Equation (2)
$W1_n$ and $Wr_n$
Calc & store next $\Delta W$ in     Equation (3)
$\Delta W_n$
End do until next
End do from 3 to 6
Print data
Exit program

---

These calculations are repeated for each of the remaining detector pairs which are to change state during lapping. The values of the OFFSETs and differential offsets, $\Delta w$, are continuously determined and the wash cycle resistance computed again from averaging the calculated offsets and calculated differential offsets.

Thus, there is described with respect to one program a method for reducing the resistance information derived from the electrical lapping guide structure of the present invention. Those skilled in the art will recognize yet other ways of reducing these measurements to effectively control leveling an lapping of batch fabricated thin film magnetic transducers to a final throat height.

We claim:

1. In a process for batch fabricating thin film transducers, a method for measuring the position of a lapped edge of a substrate supporting said thin film transducers comprising the steps of:

depositing a plurality of switching junctions on said substrate, each of said switching junctions having a distinct switching plane parallel to and a known distance away from a desired position for said lapped edge;

depositing a shunt resistance in parallel with each of said switching junctions and spaced apart from the lapped edge to avoid severing by lapping;

forming a circuit comprising each of said switching junctions connected in a series circuit;

lapping said substrate from an initial edge of said substrate toward said desired position for said lapped edge wherein each of said switching junctions changes from a closed state to an open state when said lapping plane is coincident with said switching junction switching plane whereby said shunt resistance in parallel with said switching junction which changes state is connected into said series circuit; and detecting stepwise changes in said series circuit resistance during lapping of said substrate, each of said changes indicating a change of state of one of said switching junctions thereby identifying the position of said lapped edge to be coincident with said switching plane of said switching junction which changes state.

2. The method of claim 1 further comprising:

depositing a resistor element on said substrate, said resistor element having a resistance which changes with lapping of said substrate;

measuring the resistance of said resistor each time a switching junction changes state; and determining a lapping edge position versus resistance characteristic for said lapping resistor each time a switching junction changes state, whereby said lapping resistor is recalibrated each time a switching junction changes state.

3. The method of claim 2 wherein said resistor element is positioned on said substrate between said series circuit and said supported thin film transducers.

4. The method of claim 3 wherein said switching junctions are spaced apart on said substrate with the switching junction having a switching plane closest to a final throat height being adjacent said resistor element.

5. In a process for lapping batch produced transducer elements to a final throat height, a method for accurately determining the position of a lapping plane with respect to a desired throat height comprising:

depositing on each side of a substrate an electrical lapping guide means, each of said guide means having an electrical resistance proportional to a change in lapping plane position;

forming adjacent each of said electrical lapping guide means a series circuit made from a plurality of switching means, each switching means of a plurality having a distinct switching plane which changes state when said lapping plane is coincident therewith, producing a stepwise change in resistance thereof, each series circuit producing during lapping of said transducer elements discrete resistance changes corresponding to a change in state of one of said switching element means;

measuring the resistance of each lapping guide means and each corresponding series circuit during lapping of said transducer elements; and, determining from a plurality of stepwise changes in resistance of each series circuit and measured guide means resistance levels the position of the lapping plane with respect to each side of said substrate.

6. In a process for batch fabricating thin film transducer elements, wherein said transducer element pole tips are lapped to a final throat height, a method for measuring a final throat height during lapping of said transducer elements, comprising:

forming a plurality of switching junctions on a substrate bearing said transducer elements, each of said switching junctions having a switching plane a known distance away from a desired throat height of said pole tips;

forming shunt resistance elements across each of said switching junctions;

forming a series circuit including said switching junctions;

forming an electrical lapping resistance on said substrate which provides a resistance proportional to the position of said lapped pole tips;

measuring during lapping the resistance of said series circuit and said lapping resistance;

deriving a resistance versus lapping plane position characteristic from said measured lapping resistance and each detected step change in said series circuit resistance measurements; and measuring subsequent lapping plane positions by measuring said resistance.

7. In a process for batch fabricating thin film magnetic transducers, said transducers formed in a row on a substrate and each having pole tip regions, a method for lapping said pole tip regions to a final throat height comprising:

depositing first and second electrical lapping guide structures on each end of the substrate, said lapping guides including a serial connection of switching junctions, each switching junction having a switching plane a known distance away from a final pole tip plane and terminated with a parallel resistance;

lapping said substrate along an edge parallel to said pole tip regions;

applying first and second forces to each of said ends of said substrate in a direction perpendicular to said substrate edge, said forces controlling the lapping rate at each end of said substrate;

monitoring the state of each switching junction by measuring the resistance of series connections of switching junctions; and, establishing a force differential between said first and second forces when a switching junction of one of said electrical lapping guide switching junctions changes state, said force differential being in a direction to maintain said substrate edge level.

8. The process of claim 7 further comprising:

depositing an electrical resistor between each series connection of switching junctions and a respective row end, said resistor providing for each lapping guide structure a change in resistance versus distance lapped of said substrate edge;

determining a resistance versus lapping position of said substrate edge characteristic for said resistor after each switching junction changes state;

determining a final resistance value for said resistor corresponding to said final throat height based upon said resistance versus lapping positions of said substrate characteristic; and terminating lapping of said substrate when said resistor resistance is equivalent to said determined final resistance value.

9. In apparatus for batch fabricating thin film transducers, said apparatus comprising an electrical lapping guide for measuring the position of a lapped edge of a substrate supporting said thin film transducers, said apparatus comprising:

a plurality of switching junctions formed on said substrate, in known spaced relation to said thin film transducers, each of said switching junctions having a distinct switching plane parallel to and a known distance away from a desired position for said lapped edge;

a shunt resistance formed in parallel with each of said switching junctions and spaced apart from the lapped edge to avoid severing by lapping;

an electrical circuit comprising each of said switching junctions connected in a series circuit, said electrical circuit having a first and a second terminal; and a resistor element having two terminals formed on said substrate adjacent to said plurality of switching junctions, said resistor element having a resistance which changes with lapping of said substrate, whereby, upon connection of means for measuring resistance across said first and second terminals, stepwise changes in said series circuit resistance can be detected during lapping of said substrate, each of said changes indicating a change of state of one of said switching junctions thereby identifying the position of said lapped edge to be coincident with said switching plane of said switching junction which changes state, and whereby, upon connection of means for measuring resistance across said two terminals, a lapping edge position versus resistance characteristic can be determined for said resistor element each time a switching junction changes state, whereby said resistor element is recalibrated each time a switching junction changes state.

10. The apparatus of claim 9 wherein said plurality of switching junctions are closer to said thin film transducers than said resistor element.

* * * * *